April 13, 1926.                    1,580,429
L. B. FROST
STITCH CUTTING MACHINE
Filed June 29, 1923       2 Sheets-Sheet 1

Inventor
Leo B. Frost.

Patented Apr. 13, 1926.

1,580,429

UNITED STATES PATENT OFFICE.

LEO B. FROST, OF MARIETTA, OHIO.

STITCH-CUTTING MACHINE.

Application filed June 29, 1923. Serial No. 648,516.

*To all whom it may concern:*

Be it known that I, LEO B. FROST, a citizen of the United States, residing at Marietta, in the county of Washington and State of Ohio, have invented a new and useful Stitch-Cutting Machine, of which the following is a specification.

The invention relates to improvements in shoe repair machinery, and has to do with the removal of the worn outer soles, before replacing them with new, and is for the purpose of so cutting the stitches which held the sole to the welt of the shoe, that the threads will remain in the old sole, and free the holes in the welt from any obstruction, and the stitches for the new soles may be passed through the old holes, thereby prolonging the life of the welt.

Figure 1:
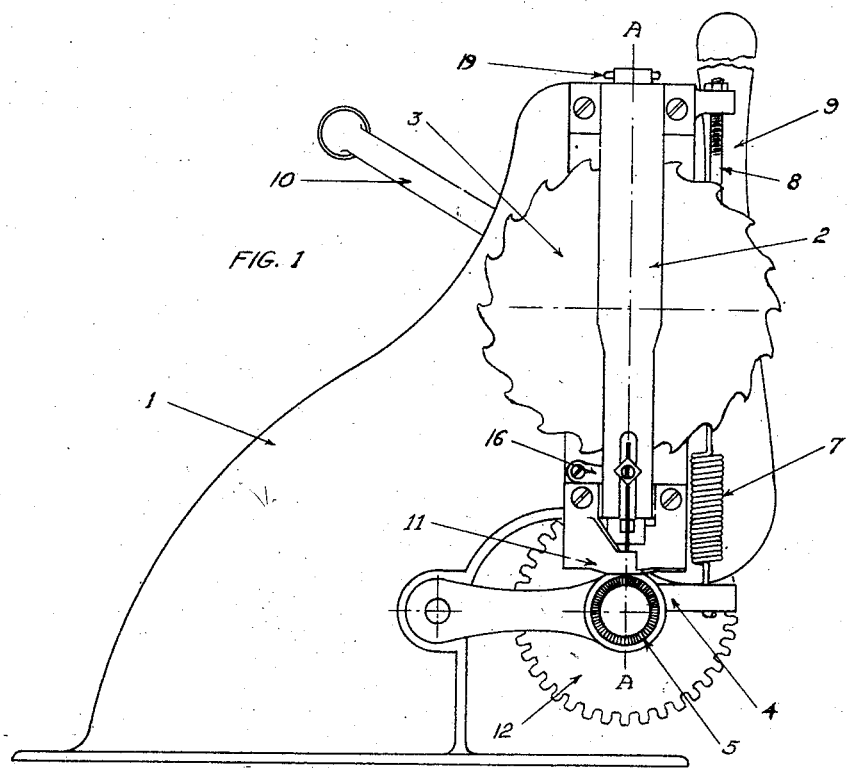
Figure 2:
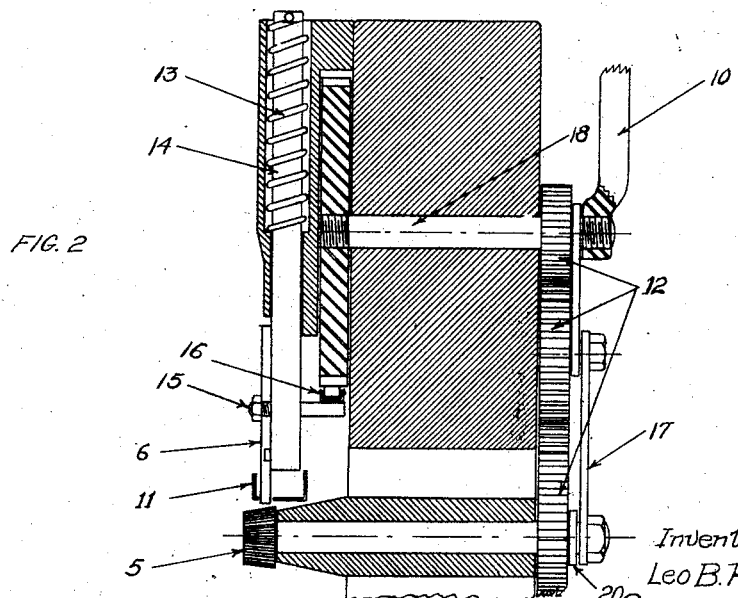
Figure 3:
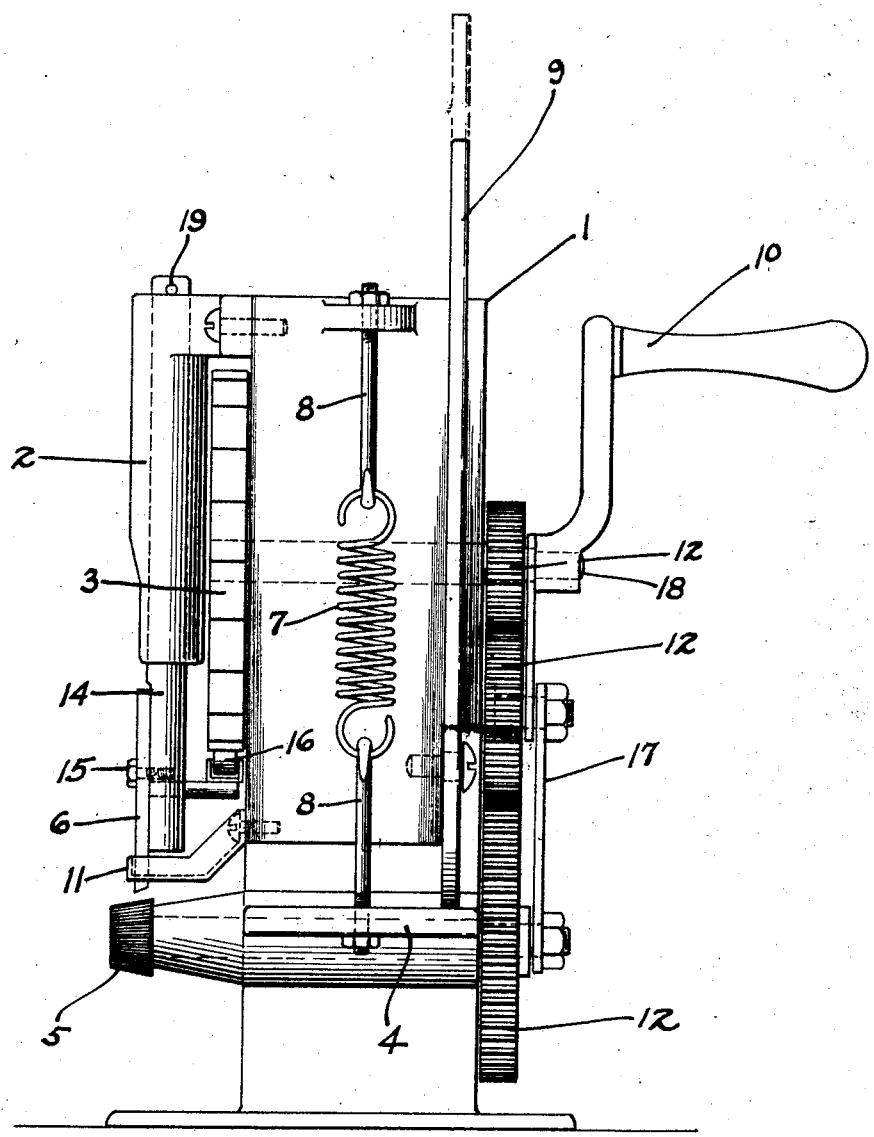

One form of the invention is illustrated in the accompanying drawing, in which Figure 1 is a side view and Fig. 2 is a sectional view on the center line A A of Fig. 1. Figure 3 is a front elevation of the machine showing the work table in position to receive a shoe welt.

Important working parts are shown in whole or in part in both views and may be referred to and located as follows:

In the drawing, 1 represents a suitable housing or casting forming the main stand or frame of the machine. 2 is an upright plunger guide mounted on the frame. 3 is a ratchet wheel arranged to impart a reciprocating motion to the plunger, one movement for each tooth of the wheel. 4 is an adjustable feed table. 5 is the feed wheel and shaft arranged beneath the knife and and plunger. 6 is a knife clamped on the plunger and adjustable vertically thereon for regulating its depth of cut. 7 represents an extension spring connected with the table 4 and normally tending to hold the feed wheel 5 in contact with the sole of the shoe. 8 represents the table spring hook and 9 is a lever by means of which the table is forced down against the tension of the spring 7 to permit the insertion of the shoe welt in position for cutting the stitches. 10 represents a crank on the end of the shaft supporting the ratchet wheel. 11 is the work table having a slot therein through which the knife reciprocates. 12 indicates gears for driving the feed wheel and its shaft from the shaft on which the crank arm 10 is mounted. 13 is the plunger spring normally tending to hold the plunger in its raised position. 14 represents the plunger whereto the knife 6 is clamped. 15 is the clamping means for holding the knife on the plunger. 16 is a dog arranged to engage the teeth of the ratchet wheel. 17 is a link connection for the gears 12. 18 represents the ratchet wheel shaft having the crank 10 on one end and the ratchet wheel 3 on its opposite end. 19 is a pin for holding the spring 13 in place on the plunger and 20 is a washer provided on the shaft of the feed wheel.

The welt of the shoe is inserted between the feed wheel and the work table when the feed table is depressed by the movement of the cam lever. When the welt is properly positioned under the reciprocating knife and is securely clamped the crank 10 is operated, revolving the ratchet wheel and imparting a reciprocating vibratory movement to the plunger and the knife blade to sever the welt stitches in succession as the welt is fed along by the feed wheel shaft so that when the stitches have all been cut the sole may be pulled away from the upper.

The adjustment of the knife support allows it to be positioned so that its cutting edge will sever the stitches and the stroke of the knife will be checked after the stitch is severed so that the edge will barely make a mark in the surface of the leather. In actual practice in the use of the machine, the knife edge makes a slight mark in the leather not sufficient however, to damage it in any way.

I claim as my invention:

1. The combination with means for clamping and feeding a shoe welt, of a welt stitch-cutting knife adapted to cut squarely across the stitches on the top of the welt, and means for reciprocating said knife toward and from the plane of the welt surface to sever the welt stitches successively and allow them to be drawn out of the welt when the sole is removed.

2. The combination with means for clamping and feeding a shoe welt, of a plunger having an up and down movement, a knife adjustably mounted thereon and having a cutting edge for engaging and severing the welt stitches, and means for operating said plunger to engage said knife with the welt stitches, said cutting edge pressing the stitches against the welt and severing them squarely and successively as the welt is fed.

3. The combination with a frame, of a feed table pivoted therein, a feed wheel mounted in said table, a work table between which and said feed table the shoe welt is clamped, a knife mounted to operate through said work table at right angles substantially to the welt to engage and sever the welt stitches, and mechanism for reciprocating said knife and revolving said feed wheel simultaneously.

4. The combination with a frame, of a feed table pivoted thereon, a feed wheel mounted in said table, a work table, a spring for normally drawing said feed table and feed wheel toward said work table, a lever for separating said feed wheel and work table against the tension of said spring, a stitch-cutting knife mounted to reciprocate toward and from said feed wheel and sever the welt stitches, and mechanism for reciprocating said knife and operating said feed wheel.

5. The combination with means for clamping and feeding a shoe welt, of a knife having a stitch-cutting edge, a plunger wherein said knife is mounted, a ratchet wheel having a series of teeth, means contacting with said teeth for imparting a reciprocating movement to said plunger when said wheel is revolved and mechanism for operating said wheel.

6. The combination with means for clamping and feeding a shoe welt, of a welt stitch-cutting knife comprising a blade having a cutting edge and movable toward and from the welt to press the stitches against the welt and sever them transversely and successively, and mechanism for actuating said blade.

LEO B. FROST.